Dec. 1, 1953 Y. THOMAS 2,660,817
SPRING MOUNTED LEVELER FOR GROUND PULVERIZERS
Filed May 1, 1951
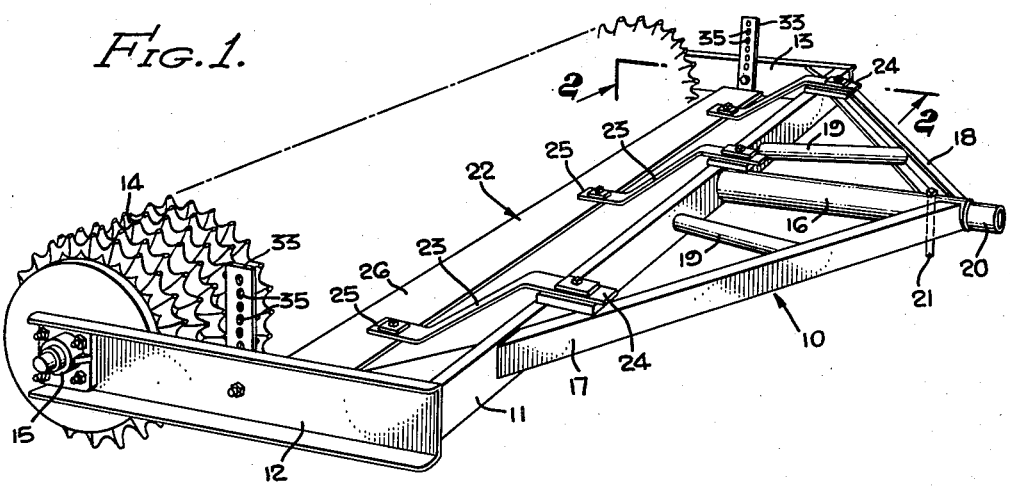
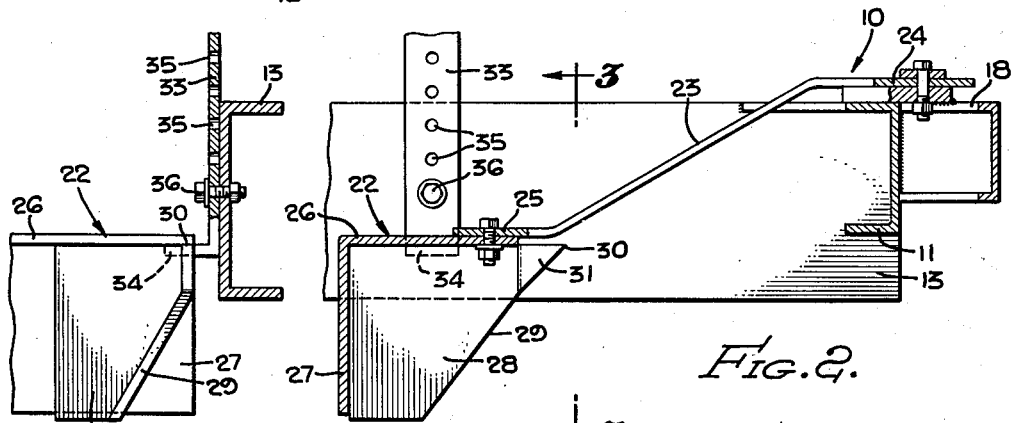
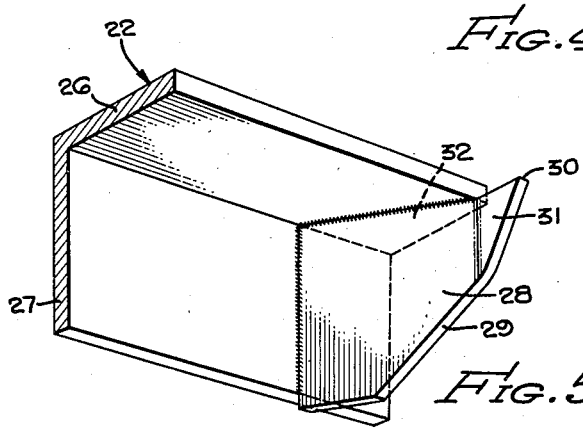
YEPPIE THOMAS,
INVENTOR.
BY
ATTORNEYS Patented Dec. 1, 1953

2,660,817

UNITED STATES PATENT OFFICE 2,660,817

SPRING MOUNTED LEVELER FOR GROUND PULVERIZERS

Yeppie Thomas, Fresno, Calif.

Application May 1, 1951, Serial No. 223,898

4 Claims. (Cl. 37—179)

This invention relates to agricultural implements and is directed to improvements in ground pulverizers employing toothed roller assemblies. This invention is particularly concerned with the spring mounting of a leveler on the frame of such devices and in the provision of a novel form of limit stops for regulating the lower limit of movement of the leveler.

It is the principal object of this invention to provide a novel form of mounting of a leveler for use in conjunction with ground pulverizers.

Another object is to provide a leveler having a scraper blade and having deflector plates at the ends thereof to direct earth clods and the like inwardly away from the ends of the leveler so that the clods may be broken up by rolling action on the ground.

Another object is to provide a device of this type in which the deflector plates and scraper blade cooperate with the frame of the device to define pockets isolated from contact by the earth clods, together with adjustable limit stops on the frame extending into the pockets to limit downward movement of the scraper blade under action of its spring supports.

Further and more detailed objects and advantages will appear hereinafter.

In the drawings:

Figure 1 is a perspective view showing a ground pulverizer embodying my invention.

Figure 2 is a sectional elevation taken substantially on the line 2—2 as shown in Figure 1.

Figure 3 is a sectional view taken substantially on the line 3—3 as shown in Figure 2.

Figure 4 is a fragmentary plan view.

Figure 5 is a perspective view showing the mounting of one of the deflector plates.

Referring to the drawings, the frame 10 includes a horizontal transverse beam 11 and a pair of rearwardly extending arms 12 and 13 fixed to the beam. A toothed roller assembly 14 extends transversely between the arms 12 and 13. This assembly 14 may take any desired form and if desired may be similar to that shown in my patent for Toothed Roller Assembly, No. 2,537,802, issued January 9, 1951. Bearings 15 on the arms 12 and 13 rotatably support the toothed roller assembly 14 on the frame 10.

A tubular element 16 is fixed to the central portion of the beam 11 and extends forwardly therefrom. Angle braces 17 and 18 are connected to the forward end of the tube 16 and to the transverse beam 11. Struts 19 connect these angle braces 17 to the beam 11. A tongue 20 is telescopically received within the tubular element 16, and a pin 21 passes through the tubular element 16 and through any one of a series of apertures in the tongue 20 for adjustably securing the tongue 20 with respect to the frame 10.

In accordance with my invention, I provide a leveler 22 which extends transversely of the frame 10 in advance of the toothed roller assembly 14 and which extends between the arms 12 and 13. Leaf springs 23 are bolted at their forward ends 24 to the transverse beam 11 and at their rearward ends 25 to the horizontal flange 26 of the leveler 22. The leveler 22 is preferably formed as an angle section in which the flange 26 is one of the legs and the downwardly extending scraper blade 27 is the other. The leaf springs 23 act resiliently to impose a downward force on the leveler 22.

A deflector plate 28 is mounted at each end of the leveler 22 for the purpose of deflecting earth clods inwardly away from the ends of the leveler. Each deflector plate has its upper edge in contact with the under-surface of the flange 26 and its rear edge in contact with the forward surface of the scraper blade 27. The leading edge 29 of the deflector plate 28 is inclined as shown in the drawings and meets the upper edge of the plate in a point 30. The forward tip 31 of the deflector plate may be bent as shown so that it does not extend laterally beyond the edge of the leveler 22. The deflector plate 28 cooperates with the scraper blade 27 and horizontal flange 26 to define an open ended pocket 32 at each end of the leveler 22. This pocket is effectively isolated from the contact by earth clods because the deflector plate 28 directs clods inwardly away from the end of the leveler 22 as the device moves forward over the ground. The limit stop member 33 is carried on each of the frame arms 12 and 13 and each is provided with a horizontal footpiece 34 which extends into the pocket 32 to a position below the flange 26. A series of openings 35 is provided in each of the members 33 and a bolt 36 passes through any one of these openings 35 to connect the stop member 33 to the arm 13 or 14. The function of the stop members 33 is to limit the downward movement of the leveler 22 with respect to the frame 10. Since the footpiece 34 on each stop member 33 engages the leveler in a location isolated from contact by earth clods, the stop members operate effectively to maintain the lower limit of travel of the leveler 22 at the desired position without danger of earth becoming entrapped between the footpiece 34 and flange 26.

In addition to the function of isolating the pocket 32 from contact by earth clods, the deflector plates 28 serve the additional function of preventing endwise escape of rolling earth clods from the leveler 22. Since the clods cannot escape endwise, they continue to roll in front of the scraper blade 27 and are broken up by this rolling action and contact with other clods.

In operation the forward end of the tongue 20 is connected to a tractor or other suitable towing vehicle. The limit stops 33 are adjustably connected to the frame arms 12 and 13 at the desired position to limit the downward movement of the leveler 22 under action of the leaf springs 23. The tractor pulls the device forwardly over the ground surface and the scraper blade 27 levels the ground while breaking earth clods which roll before it. The smaller clods pass under the scraper blade 27 and are pulverized by action of the toothed rings in the assembly 14. The accumulation of earth or clods in advance of the scraper blade 27 does not affect the control of the lowermost position of the leveler 22 because the pockets 32 are isolated from contact with the earth or clods.

Having fully described my invention, it is to be understood that I do not wish to be limited to the details herein set forth, but my invention is of the full scope of the appended claims.

I claim:

1. In an agricultural implement having a frame, the improvement comprising: a ground-contacting leveler, leaf springs connecting the leveler to the frame and acting resiliently to impose a downward force on said leveler, a deflector fixed at each end of the leveler and mounted at an angle thereto to deflect earth inwardly away from the ends of the leveler as the frame moves forward over the ground surface, each deflector cooperating with the leveler to define a pocket isolated from contact with earth, and stop elements adjustably mounted on the frame each having a portion extending into one of said pockets to limit downward movement of the leveler under influence of said leaf springs.

2. In an agricultural implement having a frame, the improvement comprising: a ground-contacting leveler, the leveler comprising an angle section having a downwardly directed blade and a forwardly directed flange, leaf springs connecting the leveler flange to the frame and acting resiliently to impose a downward force on said blade, a deflector plate fixed at each end of the angle section and mounted at an angle thereto to deflect earth inwardly away from the ends of the leveler as the frame moves forward over the ground surface, each deflector plate cooperating with the flange and blade to define a pocket isolated from contact with earth, and stop elements adjustably mounted on the frame each having a portion extending into one of said pockets to limit downward movement of the leveler under influence of said leaf springs.

3. In an agricultural implement of the type described, the combination of: a frame provided with a transverse beam, a tongue extending forwardly from said beam, a pair of laterally spaced arms extending rearwardly from said beam, a ground-contacting leveler positioned between the arms, the leveler comprising an angle section having a downwardly directed blade and a forwardly directed flange, leaf springs connecting the leveler flange to the beam and acting resiliently to impose a downward force on said blade, and a stop element adjustably mounted on each of the frame arms each having a portion extending under the flange in advance of the blade to limit downward movement of the leveler under influence of said leaf springs.

4. In an agricultural implement of the type described, the combination of: a frame provided with a forwardly extending tongue and a pair of laterally spaced rearwardly extending arms, a ground-contacting leveler positioned between said arms, leaf springs connecting the leveler to the frame and acting resiliently to impose a downward force on said leveler, a deflector fixed at each end of the leveler and mounted at an angle thereto to deflect earth inwardly away from the ends of the leveler as the frame moves forward over the ground surface, each deflector cooperating with the leveler to define a pocket isolated from contact with earth, and stop elements adjustably mounted on the frame arms each having a portion extending into one of said pockets to limit downward movement of the leveler under influence of said leaf springs.

YEPPIE THOMAS.

References Cited in the file of this patent

UNITED STATES PATENTS

| Number | Name | Date |
|---|---|---|
| 1,876,867 | Dean | Sept. 13, 1932 |
| 2,459,591 | Schumaker et al. | Jan. 18, 1949 |
| 2,495,310 | Armington | Jan. 24, 1950 |